(12) United States Patent
Jayachandran et al.

(10) Patent No.: US 10,073,545 B2
(45) Date of Patent: Sep. 11, 2018

(54) APPARATUS, SYSTEMS AND METHODS FOR HUMAN COMPUTER INTERACTION

(71) Applicants: Guha Jayachandran, Cupertino, CA (US); Vishal Vaidyanathan, Carlsbad, CA (US)

(72) Inventors: Guha Jayachandran, Cupertino, CA (US); Vishal Vaidyanathan, Carlsbad, CA (US)

(*) Notice: Subject to any disclaimer, the term of this patent is extended or adjusted under 35 U.S.C. 154(b) by 457 days.

(21) Appl. No.: 14/069,346

(22) Filed: Oct. 31, 2013

(65) Prior Publication Data

US 2015/0286331 A1    Oct. 8, 2015

Related U.S. Application Data

(60) Provisional application No. 61/720,945, filed on Oct. 31, 2012.

(51) Int. Cl.
*G06F 3/0354* (2013.01)
*G06F 3/039* (2013.01)
*G06F 3/0488* (2013.01)

(52) U.S. Cl.
CPC .......... *G06F 3/03547* (2013.01); *G06F 3/039* (2013.01); *G06F 3/04883* (2013.01)

(58) Field of Classification Search
CPC ....... G06F 3/03545; G06F 2203/04101; G06F 2203/04108
See application file for complete search history.

(56) References Cited

U.S. PATENT DOCUMENTS

| | | | |
|---|---|---|---|
| 2002/0003726 A1* | 1/2002 | Hattori et al. | 365/200 |
| 2002/0024499 A1* | 2/2002 | Karidis et al. | 345/156 |
| 2003/0016282 A1* | 1/2003 | Koizumi | G06F 3/03545 347/143 |
| 2010/0177054 A1* | 7/2010 | Iida et al. | 345/173 |
| 2011/0227487 A1* | 9/2011 | Nichol et al. | 315/158 |
| 2012/0098772 A1* | 4/2012 | Eun et al. | 345/173 |
| 2014/0035840 A1* | 2/2014 | Guerin et al. | 345/173 |

* cited by examiner

*Primary Examiner* — Roberto Flores (57) ABSTRACT

The present invention relates to the field of human-computer interaction and in particular, to apparatus, systems, and methods for facilitating interaction with computers and computing systems in an intuitive manner.

10 Claims, 4 Drawing Sheets

APPARATUS, SYSTEMS AND METHODS FOR HUMAN COMPUTER INTERACTION

This application claims the benefit of U.S. Provisional App. No. 61/720,945, filed on Oct. 31, 2012, incorporated by reference in its entirety.

BACKGROUND

Field of the Invention

The present invention relates to the field of human-computer interaction and in particular, to apparatus, systems, and methods for facilitating interaction with computers and computing systems in an intuitive manner.

Description of Related Art

Human interaction with modern computers and computing systems has often been limited by the use of non-intuitive input and output mechanisms that serve as a barrier to even greater adoption and use of computing technology. For example, young children and older adults are often uncomfortable using keyboards, pointing devices, and/or screens such as touchscreens. Further, parents keen to develop handeye coordination and improve handwriting in young children may prefer the use of traditional writing media to keyboards. To a limited extent modern tablet computers have helped with greater adoption of computing technology by simplifying operation through the use of multitouch screens and virtual keyboards. However, tablet computers have also not addressed the use of more intuitive writing media to facilitate user-interaction.

Many professionals often use paper or other writing media to sketch ideas, concepts or perform initial assessments, prior to a detailed or more formal elaboration of the ideas using computers. Typically, any computations or processing to aid concept development and/or initial assessments are performed separately using computers and these computer generated results may then be incorporated or put on paper in order to proceed with the assessment. For example, an engineer may use a separate tablet computer to verify calculations or perform a sanity check prior to more detailed modeling. A teacher may use a computer to aid with computations written on a classroom whiteboard. In all of the above situations, the use of a computer to aid with computation leads to a break in the thought process and interferes with creative exercise. Moreover, there is no easy way to convert, capture, preserve and recall the concepts developed using writing media transparently for later use in a computing environment.

Therefore, there is a need for systems, methods, and apparatus for facilitating interaction with computers and computing systems in an intuitive manner using writeable media.

SUMMARY

Consistent with embodiments disclosed herein, apparatus, systems and methods for facilitating interaction with computers and computing systems in an intuitive manner using traditional writing media are presented. In some embodiments, the apparatus may comprise: a writeable medium, wherein markings are produced in or on the writeable medium when the writeable medium is subjected to a stimulus; a plurality of sensors, wherein the sensors generate position data by tracking a sequence of contact positions of a stylus on the writeable medium; and a processing system. The processing system may be capable of initiating a display of the markings on the writeable medium by generating appropriate stimuli, wherein the markings displayed on the writeable medium correspond to the sequence of contact points of the stylus on the writeable medium; generating tokens by performing pattern recognition based, in part, on the position data; executing commands by parsing the tokens, and initiating a display of the results obtained by the execution of commands on the writeable medium.

Embodiments also relate to software, firmware, and program instructions created, stored, accessed, or modified by computers and/or processors using computerreadable media or computer-readable memory. The methods described may be performed on various devices including distributed computing systems such as clouds.

These and other embodiments are further explained below with respect to the following figures.

DETAILED DESCRIPTION

Consistent with embodiments disclosed herein, apparatus, systems and methods for facilitating user interaction with computers and computing systems using writeable media are presented.

Figure 1:
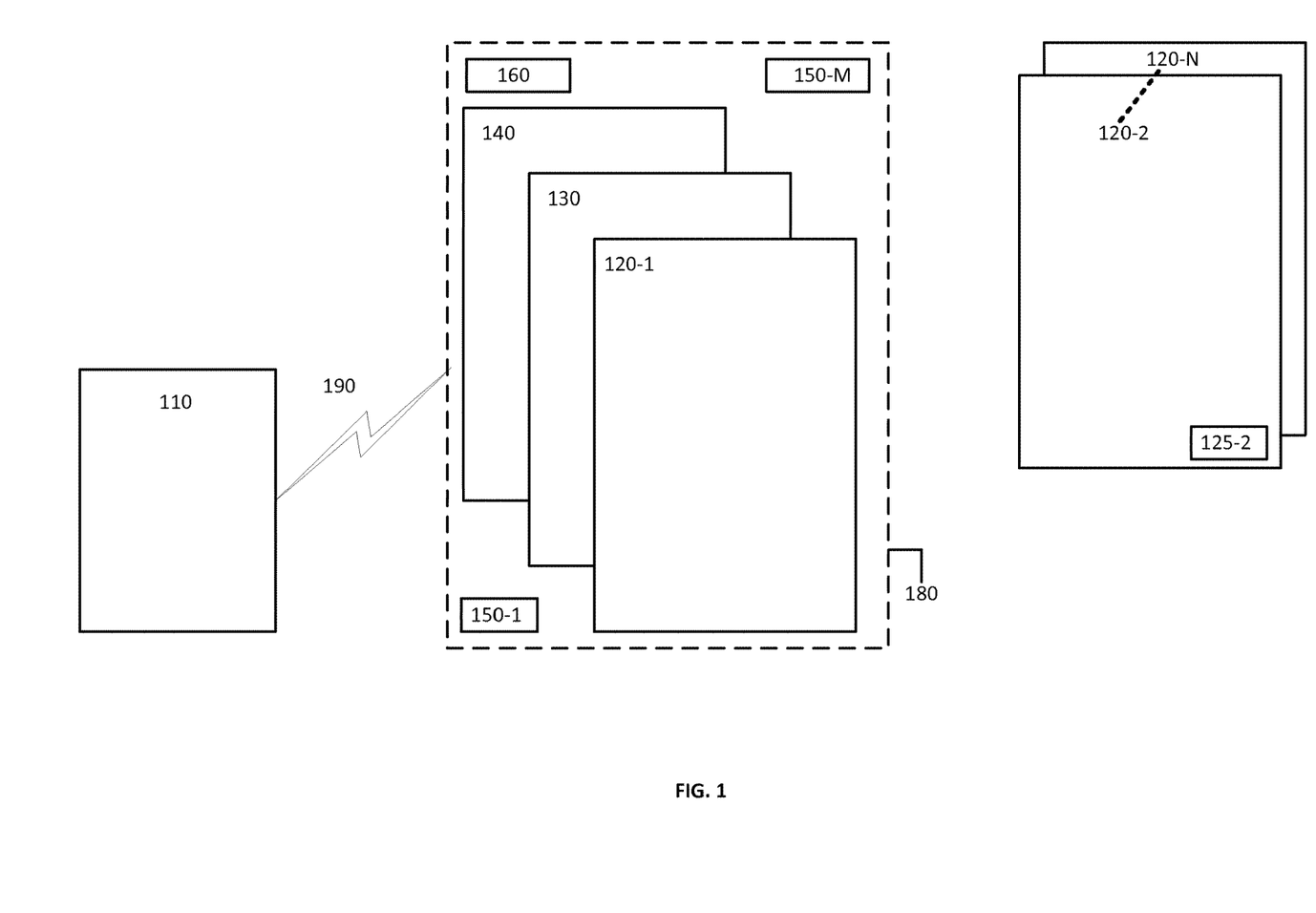
FIG. 1 shows a block diagram illustrating an exemplary system for facilitating user interaction with computing systems using writeable media.

FIG. 1 shows a block diagram illustrating an exemplary system 100 for facilitating user interaction with computing systems using writeable media. As shown in FIG. 1, exemplary system 100 may include computing system 110 wirelessly coupled to writepad device 180 using wireless link(s) 190. For example, wireless link 190 may use Bluetooth or other near field communication technology. In some embodiments, writepad device 180 may be wirelessly coupled to computing system 110 using WiFi (based on the IEEE 802.11 family of standards or variants thereof) using wireless access points and/or over mobile communication networks such as 3rd Generation mobile telecommunication ("3G") and/or $4^{th}$ Generation mobile telecommunication ("4G") networks (such as Long Term Evolution ("LTE"), LTE Advanced, or Wi-Max and variants thereof) using one or more supported communication protocols. In some embodiments, writepad device 180 may also be able to communicate with computing system 110 over traditional wired networks.

In some embodiments, computing system 110 may take the form of one or more of a cloud computing system, a system of networked computers, desktop, laptop, and/or tablet computers, smart phones, handheld computing devices, and/or special purpose apparatus that facilitates user interaction with computers and computing systems using writeable media in a manner consistent with embodiments disclosed herein. In some embodiments, computing system 110 may also comprise non-volatile memory capable of storing and executing program code, applications, operating systems, databases, knowledge bases, etc. In some embodiments, computing system 110 may communicate with writepad device 180 and receive one or more of data, context for the data, and/or commands/instructions. Computing system 110 may process the received data based on a current context and/or in accordance with the instructions or commands received from writepad device 180 and return data, results, errors, instructions, and/or other messages to writepad device 180. In some embodiments, data, commands and/or messages exchanged between writepad device 180 and computing system 110 may be compressed and/or encrypted.

Writepad device 180 may take on a variety of shapes and sizes and embodiments disclosed herein are non-limiting and for illustrative and explanatory purposes only. For example, writepad device may take on the form factor of a tablet, a notebook, pocketbook, handheld device, whiteboards of various sizes, and/or be incorporated in various toys or other devices. In some embodiments, writepad device may include a stylus (not shown) such as a pen, various writing instruments, or other penlike devices to interact with writeable medium 120. In some embodiments, a human finger may be also be used to interact with writeable medium 120. The term stylus as used herein refers to one or more instruments including human fingers that may be used to interact with writepad device 180. In some embodiments, writepad device 180 may also include one or more ports such as USB and/or Ethernet ports for networking and/or interfacing with other devices and computers, and may also support removable computer readable media such as memory cards, flash drives, etc.

In some embodiments, writeable media 120, such as exemplary writeable medium 120-1 may be placed or superimposed on exemplary surface 130, which, in some implementations, may take the form of a pressure sensitive surface such as a resistive or capacitive surface like those used in touchscreens.

In some embodiments, writeable media 120 may be removable. For example, writeable medium 120-1 may be removed and any one of writeable media 120-2 . . . 120-N may be used in place of writeable medium 120-1. In one embodiment, removable writeable medium 120-$i$ may be capable of being manually detached from the writepad device 180 by the user by hand with or without the assistance of an instrument and the process of detachment may leave writeable medium 120-$i$ and/or writepad device 180 functionally intact. For example, writeable medium 120-$i$ may be physically or mechanically affixed or held in place using clamps, clips, and/or a variety of mechanical devices, etc., which the user may be able to manually open at will to (i) remove writeable medium 120-$i$ and/or (ii) attach another writeable medium 120-$j$. Writeable medium 120-$i$ may also be held in place by weak chemical interactions, for example by using low-tack adhesives (such as those found in Post-it notes®), which allow the medium to be easily attached and detached. In some embodiments, mechanical, chemical, magnetic, or other attachment techniques may be selected so that no visible marks or residue are left on a writeable medium 120-$i$ that is being attached or detached.

In general, writeable medium 120 can be any medium that shows markings and/or color transitions when subjected to a stimulus. Writeable medium 120 is optionally a solid or semisolid. In some embodiments, writeable medium 120 may be shaped to have low to negligible thickness compared to its height and width so that it has a sheet-like form or appearance to the user. In some embodiments, the thickness of writeable medium 120 may vary from less than a few inches to a few millimeters or even less. For example, in one embodiment, writeable medium 120 may have a thickness between 0.5-1 mm. In another embodiment, writeable medium 120 may have a thickness in the range of 0.5-0.1 mm, or even less.

In some embodiments, writeable medium 120 may be opaque to human view. In other embodiments, writeable medium 120 may be partly or fully transparent to the human eye. In situations where writeable media 120 is transparent, writepad device 180 may comprise a visually opaque barrier between the internal components of writepad device 180 (such as sensors 150 or output modules 140) and writeable medium 120. Writeable medium 120 can be inflexible or flexible. In some embodiments, writeable medium 120 may exhibit high bending stiffness per unit grammage, which can facilitate user manipulation of the medium especially when thinly shaped. In some embodiments, writeable medium 120 may be capable of absorbing or retaining deposited substances such as pigments, inks, graphite, charcoal, wax, etc. Further, in some embodiments, writeable medium 120 may be capable of absorbing deposited fluids without substantial visual blurring or spreading. For example writeable medium 120 may exhibit a thickness, opacity, ink holdout ability, and/or flexural rigidity that is comparable to any paper commonly used for writing or printing such as coated glossy paper, ledger, bank, bond or newsprint paper. In some embodiments, writeable media 120 may comprise paper or paper-like media. Paper media may optionally comprise plant fibers or cellulose, where the cellulose can be underivatised or derivatised.

In some embodiments, writeable medium 120 may be selected to offer a high contrast to the color of the markings generated by the user or the device. For example, writeable medium 120 can be light-colored (e.g. white) when the markings are dark-colored (e.g., black) or vice versa. In some embodiments, writeable medium 120 may comprise a substantially homogeneous matrix of organic and/or inorganic fibers or polymers along with one or more coatings and additives such as inks described herein. In some embodiments, writeable medium 120 may be micro-fabricated to comprise internal structures such as semiconductor devices, electronic or optical devices such as electrodes, filters, capacitors, electro-optic modulators, Liquid Crystal Displays ("LCD") or Light Emitting Diodes ("LED").

In some embodiments, a user and/or the device (e.g., via output module 140) can optionally cause changes (markings) in or on writeable media 120. In some embodiments, the changes may be in one or more optical properties of the medium (e.g., color, intensity, fluorescence absorption or emission, or absorption or emission of electromagnetic radiation such as light, including light in the visible range). For example, the change in one or more optical or other properties in sensitive writeable media 120 can occur upon exposure to or in response to an appropriate stimulus. In some embodiments, the change may take the form of a visible change detectable to human eyesight, unaided or aided (e.g., aided by polarized viewers, optical filters, etc).

In some embodiments, writeable medium 120 can comprise substances with selected optical properties, which are referred to as "inks" herein. Optionally, inks have desirable or distinctive optical properties under the proper conditions (e.g., before, during or after exposure to an appropriate stimulus). Exemplary optical properties include color, opacity, intensity, opacity, fluorescence absorption or emission or energy transfer, or absorption or emission spectra of electromagnetic radiation such as light in the visible range. In some embodiments, at least one optical property of an ink is visible to the human eye under the proper conditions. In some embodiments, inks, which show a change in one or more optical properties in response to an appropriate stimulus may be used and the change(s) exhibited by the ink (when acted upon by the appropriate stimulus) may be temporary (e.g., lasting fractions of a second, seconds, minutes, or hours), or permanent. For example the ink can have low visibility before exposure to a stimulus and high visibility after, or vice versa. Exemplary inks include pressure-sensitive, photochromic, thermochromic, electrochromic, magnetochromic, ionochromic or other substances, or any combination thereof.

In some embodiments, writeable media 120 may comprise coated paper like media. For example, paper or paper-like material may be coated with photochromic, thermochromic, or other dyes. In some embodiments, the coating(s) on writeable media 120-1 may cause markings and/or color transitions to be displayed on writeable media 120-1 when subjected to appropriate stimuli. In some embodiments, the stimulus may occur when an appropriate stylus or other instrument makes contact with writeable media 120.

In some embodiments, the generation of the stimulus can be controlled by the user ("input" stimulus) and/or by one or more device components ("output" stimulus). Exemplary writepad device 180 components that generate an output stimulus include processing system 160 and/or output module 140. In some embodiments, writeable medium 120 can optionally be sensitive to two or more different types of stimuli, e.g., by comprising two or more separate inks.

For example, writeable medium 120 can comprise a photochromic, thermochromic or electrochromic ink for to respond to an output stimulus and a pressure-sensitive ink for to respond to an input stimulus. When using such writeable media 120, the output stimulus can comprise heat or electromagnetic radiation such as light. The input stimulus can optionally be generated directly by a stylus manipulated by the user. For example a stylus can mark the pressure-sensitive writeable medium 120 by contact or pressure. Direct contact of the user-manipulated stylus with writeable medium 120 or proximity between the two can act as the stimulus that marks writeable medium 120.

In another exemplary embodiment, the stylus can make a visible mark in or on writeable medium 120 by depositing an optically detectable substance such as ink into or onto writeable medium 120. In such embodiments, writeable medium 120 may be designed to respond by an optical property change in response to an output stimulus but not to an input stimulus. In another example, writepad device 180 component(s) or a user-manipulated stylus generates an appropriate stimulus such as light, heat, pressure, electricity, etc, to which the writeable medium 120 is sensitive. In other examples the proximity or contact of writepad device 180 component(s) or stylus with writeable medium 120 can cause marking in or on writeable medium 120. For example, writepad device 180 component(s) or stylus can deposit a substance that differs from the writeable medium in one or more optical properties. If the writeable medium contains a pressure-sensitive ink, the pressure of the device component(s) or stylus on the medium can generate the desired marking. For example, if the writable medium contains a thermochromic substance, the device component(s) or stylus can generate markings by emitting heat or radiation onto the medium for example to raise its temperature.

In some embodiments, the sequence of contact points of the stylus with writeable medium 120-1 may be recorded and appropriate stimuli may be generated by writepad device 180 to cause marks corresponding to the sequence of contact points to appear on writeable medium 120-1. For example, a user may make cause marks to appear on writeable media 120 by using a stylus to make contact with writeable medium 120-1. In some embodiments, marks corresponding to the sequence of contact points may appear on writeable medium 120-1 in real time and in a manner transparent to the user. For example, it may not be apparent to users that the marks are being generated through stimuli (e.g. from processing system 160 and/or output module 140) and not directly by the stylus.

In one embodiment, the position(s) and/or displacement(s) corresponding to strokes made by a stylus or other device on writing medium 120-1 such as photochromic paper placed on surface 130 (which may take the form of a resistive touchscreen) may be detected and recorded. For example, the position(s)/displacement(s) may be recorded using sensor system 150 comprising one or more exemplary sensors 150-1 . . . 150-M. As another example, surface 130, which may take the form of a pressure sensitive screen under writeable medium 120-1, may detect and capture the points of contact of a stylus, including writing implements or the user's finger. In one embodiment, the optical properties of one or more components of the device described herein such as the screen or the output module do not change under exposure to a user-generated stimulus. In another embodiment, writeable medium 120 may be sensitive to an input stimulus, while other components may be insensitive to user's stylus input stimuli although they may be sensitive to an output stimulus generated by device components such as processing system 160 and/or output module 140.

As another example, sensor system 150 may take the form of a system of light sources and sensors. In one implementation, the light sources and sensors may be placed on the upper edges of writeable medium 120-1 so that the sides of the exposed surface of writeable medium 120-1 are lined with pairs of emitters and light sensors. Dark spots (from the absence of light) on sensors that may be created by the placement of a stylus or other instrument may be recorded. As a further example, an optical sensor grid may be used to capture an image of writeable medium 120-1 and/or user actions on writeable medium 120-1 in real-time.

In some embodiments, the positions, displacements, images and/or other data recorded by writepad device 180 may be sent to and/or retrieved by processing system 160 coupled to writepad device 180. In some embodiments, positions, displacements, images and/or data may also be sent to computing system 110 over wireless link(s) 190.

In some embodiments, some or all of the processing system coupled to writepad device 180 may be resident on writepad device 180. In one implementation, processing system 160 coupled to writepad device 180 may include one or more of: Application Specific Integrated Circuits (ASICs), Field Programmable Gate Arrays (FPGAs), processors, memory, electrical, electronic and/or electromechanical components, and/or program code to receive and store position, displacement, image and other data, communicate with computing system 110 and to control output module 140.

In some embodiments, processing system 160 may convert the user input into internal data structures. These data structures may then be stored into volatile or non-volatile memory. The memory may be in the form of a built-in device or a user-removable device, such as a DRAM, USB stick, SD card, compact flash card, solid-state drive, magnetic drive, and other memory technologies. The data structures may be communicated to other devices (possibly other writepads or other computing devices) using wired or wireless communication technologies, for example using a serial or parallel port, USB, modems, cable modem, Ethernet, WiFi, radio link, Bluetooth or other method.

In one embodiment, processing system 160 may analyze the data structures obtained from the user input and generate output data structures. The output data structures may use information stored previously on the device, or obtained from other devices (other writepads, or other computing devices) over any of the communication technologies mentioned previously. For example, in the case of written input, the processing system may convert the strokes of the user input into letters, words or sentences (text). The processing system may analyze the text and generate suitable output text and/or images. As another example, the user input may be an image or a pattern, which the processing system may convert into a suitable data structure which it may then transmit or record or analyze. The processing system may recognize the image and generate another image and/or text as the output data structure.

In some embodiments, processing system may use various analytical techniques such as pattern recognition, gesture recognition, character recognition, stroke recognition, etc. to perform analysis of the internal data structures (e.g. lexical and/or semantic and/or grammatical and/or linguistic analysis for written text, expression parsing for mathematical expressions, or geometrical analysis for image data, etc.) and generate output data structures. In some embodiments, information pertaining to the time sequence of stylus movements and other stylus tracking data may be used when applying one or more of the above analytical techniques.

In some embodiments, processing system 160 coupled to writepad device 180 may generate appropriate stimuli to generate markings on the writeable medium using output module 140. The processing system 160 may convert internal data structures into a pattern of markings on the writeable medium. For example, textual data may be displayed on the writeable medium as user-readable text. For example, image data may be displayed on the writeable medium as an image.

In some embodiments, processing system 160 may use the position data such as, for example, a sequence of contact points of a stylus with writeable medium 120-1 to process context-dependent input, user gestures, perform recognition of strokes or characters in a script, etc. and generate appropriate control signals for output module 140 to cause a display of user-input on writeable medium 120-1. For example, in writepad device implementations, where a photochromic writeable medium 120-1 is stacked or superimposed on output module 140, surface 130 may be transparent to the light that is used to trigger marking and/or color changes in photochromic writeable medium 120-1. Thus, user input may be displayed on writeable medium 120-1. In some embodiments, output module 140 may also cause the display of images including one or more of user markings, stored images, and/or generated output on writeable medium 120-1.

Photochromic coatings are chemicals that are known to change color temporarily or permanently when struck by light of certain wavelengths and may be used to coat writeable medium 120. Further, light sources are now available in several wavelengths. Accordingly, in some embodiments, light sources for writepad device 180 and photochromic inks to coat writeable media 120 may be paired so that there is minimal impact or noise ambient light. In addition, in some embodiments, to minimize impact from sunlight or ambient light, which can contain a broad spectrum of radiation, writeable media 120 may also be coated with appropriate UV-resistant and/or infrared (IR)-resistant sunscreen. For example, one or both sides of writeable medium 120 may be coated with photochromic ink. Further, writeable medium 120 may also be coated with one or more layers of sunscreen. Accordingly, in the exemplary implementation above, the light source from below writeable medium 120 can trigger color changes on writeable medium 120, while sunlight from above may be blocked or significantly attenuated. Alternatively or in addition to sunscreen, the writeable medium may include a layer of an ultraviolet filter. For example, the writeable medium can consist of multiple layers, with the device-facing layer responding to a stimulus from the device, intermediate layer or layers that act as suitable filters and a layer presenting a writeable surface to the user. Optionally the materials used in the different layers are designed so that any changes in the device-facing layer are visible to the user through the intervening layers. For example, the layers may be partly or completely transparent or thin. For example, the writeable medium may be constructed of three layers, the bottom layer comprising photochromic ink, the middle layer being an ultraviolet and/or infrared filtering material and the top layer being made of material suitable for writing by the user.

In some embodiments, output module 140 may comprise raster display circuitry and/or components. For example, output module 140 may comprise a light source such as a laser source with two or more spinning mirrors. The light source can be directed to a first rotating mirror, which can be polygonal, with a rotational axis perpendicular to the writing surface. The rotation of the first mirror reflects the beam to a second rotating mirror. The second mirror, which has a rotational axis parallel to the writing surface, may be prismatic in shape. The second mirror may reflect the light beam through surface 130, which may be transparent to the light, on to writeable medium 120-1.

In some embodiments, control circuitry in output module 140 may keep track of the current positions of the mirrors. Any "point" on the paper corresponds to a specific angle or set of angles of the first and second mirrors. Therefore, the angles of the mirrors may be used to determine the current position of the light on writeable medium 120-1. Depending on whether a dot should be shown at that position, light source may be turned on or off. For example, in the example above, if writeable medium 120-1 uses photochromic ink, then the photochromic ink will change color when struck with the light. In some embodiments, photochromic ink may be chosen so that it fades away slowly. Slow fading photochromic ink permits the use of a lower rotational speed in the rotating mirrors because each point on photochromic writeable medium 120-1 can be refreshed less frequently over some given time period.

In some embodiments, output module 140 may comprise vector display circuitry and/or components. For example, output module 140 may comprise a light source mounted using electromechanical actuators such as motors, servos, and/or steppers. The electromechanical actuators may be used to adjust the orientation of the light beam in two dimensions. For example, a light source may be anchored at its non-beam end while the beam-end is mounted on finely threaded vertical and horizontal screws, which are connected to the actuators. By controlling the each actuator (using voltage, current, pulse width modulation, etc.), control circuitry may create markings as desired on an exemplary photochromic writeable medium 120-1.

In some embodiments, a laser diode and associated optics may be mounted with cords, arms or other suitable apparatus on actuators that permit translation or movement of the laser diode in a plane parallel to the output surface. Control circuitry may be used to keeps track of actuator positions so that the laser diode can be turned on or off at appropriate positions to generate patterns on exemplary photochromic writeable medium 120-1. Depending on the speeds of the actuators, the system above may be used as both a raster or vector display system.

In some embodiments, output module 140 may comprise some combination of raster and vector display schemes. For example, output module 140 may comprise control circuitry to control rotation (angular actuation) and/or translation actuation of the source and/or one or more mirrors in combination. For example, the light source may be rotated in one dimension using an actuator and the light beam can then be reflected by a mirror that can either be rotated or linearly actuated. As another example, the light source and angular actuators may be mounted on a on a translational platform that travels over one dimension of the output area.

In some embodiments, output module 140 may comprise a LCD mask and a backlight that can trigger a change in exemplary photochromic writeable media 120-1. In one exemplary implementation, an LCD screen (which may be monochrome) may be placed between photochromic writeable medium 120-1 and a light source (which may be planar). Patterns formed on the LCD screen may be used to selectively block light from the backlight from reaching the photochromic paper. Light that reaches exemplary photochromic writeable medium 120-1 results in the desired pattern being displayed on writeable medium 120-1. Optionally, the backlight in such situations emits radiation having wavelengths in the non-visible range, or for example is capable of emitting some but not all wavelengths in the visible range. In an example the backlight emits ultraviolet radiation and/or visible light in the violet range, but does not emit significant radiation in the red or yellow portions of the visible.

In a further embodiment, output module 140 may comprise a grid of heating elements placed under exemplary thermochromic writeable medium 120-1. Each individual heating element can be electronically raised to a temperature that is sufficient to cause the ink to change upon the paper and thus mark a dot, line or other pattern. For example, based on locations of the stylus on exemplary thermochromic writeable medium 120-1, appropriate heating elements may be raised to recreate the user input pattern on exemplary thermochromic writeable medium 120-1. Any output to be displayed may also be similarly generated on exemplary thermochromic writeable medium 120-1.

In some embodiments, output module 140 may comprise a mechanical marking system, which may be used with an actual ink pen or pencil or other marking device to directly produce output on writeable medium 120-1. Actuators may be used to move the writing device to produce output on the writeable medium 120. In one exemplary embodiment, the output system may be placed on top of the writing surface and an appropriate user activated mechanism may be used to engage the output system for output, or disengage the output system during periods where a user was interacting with writeable medium 120-1.

In some embodiments, writepad device 180 may include physical or virtual buttons or other interfaces (not shown) that permit users to power the device on and off, reset the device, clear writeable media, selectively clear memory, enter input of various types, save the screen, adjust device parameters and configuration, set or change the color of markings produced by the stylus, set up the device to connect to wireless networks and computing system 110, request output, etc. In some embodiments, the buttons may be user actions such as double touch, slide, press, press and hold etc. In some embodiments, the buttons may mechanical, optical, pressure sensitive etc. Further, writepad device 180 may include various other software, hardware and firmware components as would be apparent to one of ordinary skill in the art including, but not limited to a power supply unit, which may receive power from batteries, solar cells, USB ports and/or operate using power from a wall power socket.

In some embodiments, writepad device 180 may comprise removable/interchangeable writeable media 120. In some embodiments, writeable media 120-i may comprise associated identifiers 125-i such as one or twodimensional bar codes, glyphs, RFID tags, or other identifiers. In some embodiments, identifiers 125-i enable identification of associated individual writeable media 120-i, $1 \leq i \leq N$. For example, as shown in FIG. 1, exemplary writeable medium 120-2 comprises associated identifier 125-2. In some embodiments, when a user saves an image displayed on current writeable medium 120-i, the image may be automatically associated with identifier 125-i. In some embodiments, users may be able to automatically restore one or more stored images associated with an identifier 125-i when writeable medium 120-i is placed on top of surface 130, or is otherwise designated as the current writeable medium.

In some embodiments, sensors 150 may also comprise bar code readers, glyph readers, RFID receivers, or other devices capable of reading identifiers 125. In some embodiments, identifiers 125, which may take the form of bar-codes or glyphs may be placed on the underside of writeable media 120 and read when the writeable media is placed on exemplary surface 130. In some embodiments, writepad device 180 may automatically pull up one or more images associated with the identifier 125-i for current writeable medium 120-i. For example, a default image specified by the user, the last saved image, the most frequently accessed image, or the first saved image may be automatically selected and displayed on writeable medium 120-i.

Figure 2:
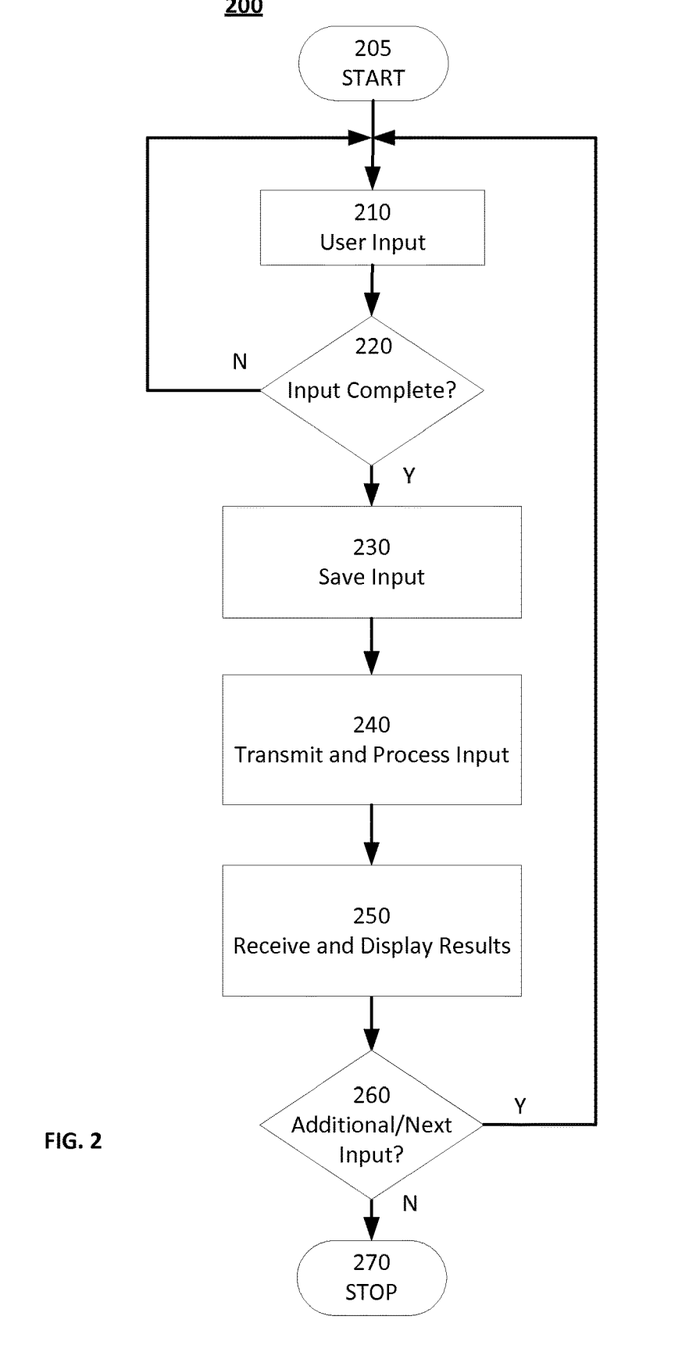
FIG. 2 shows a flowchart illustrating an exemplary method for processing user input and generating output on a system for facilitating user interaction with computing systems using writeable media.

FIG. 2 shows a flowchart illustrating an exemplary method 200 for processing user input and generating output on a system for facilitating user interaction with computing systems using writeable media. In some embodiments, exemplary method 200 may be implemented and executed using system 100.

In some embodiments, method 200 may start in step 205. For example, writepad device 180 may be powered on, activated, or reset. In step 210, the user input may be received. For example, a user may begin writing on writeable medium 120-1, for example, by drawing characters, images etc. using a stylus. In some embodiments, the sequence of contact positions of the stylus with and/or movements writeable medium 120-1 may be captured by sensors 150. In some embodiments, these positions and/or movements may be temporarily stored in a cache, RAM or other memory on writepad device 180.

In step 220, the device may check whether input has been completed. For example, a user may indicate that input has been completed by pressing a button, tapping twice on writeable medium 120-1, or initiating some other predefined sequence of events. If the input has been completed, ("Y" in step 220), the algorithm may proceeds to step 230, where the input data recorded may be saved. If input is not complete, in step 220, then, the algorithm may return to step 210.

In step 240, input data may be transmitted and/or processed. For example, input data may be transmitted by writepad device 180 to computing system 100 over wireless link 190. In some embodiments, writepad device 180 may perform some processing of the input data prior to transmitting the data to computing system 110. For example, in one embodiment, processing system 160 may perform lexical analysis and use the recorded position data to recognize tokens or character sequences written on writeable medium 120-1.

In a simple tutoring application for children, for example, processing system 160 may recognize characters as "2+3=" or "2+3=?". In some embodiments, processing system 160 may comprise a processor that may calculate the result as "5." In some embodiments, processing system 160 may process the input based on context. For example, processing system 160 may recognize "tokens", which may be graphics, keywords or symbols in the input data that may indicate a context for input data associated with the token.

In some embodiments, one or more applications may be loaded on writepad device 180 and/or computing system 110 and may be invoked prior to input to determine context. For example, a math application may be invoked using a button on writepad device 180. As another example, an application may cause a picture to be displayed on writeable medium 120-1 and the user may be prompted to identify the picture by writing onto writeable medium 120-1. The written text may be processed to match with provided answers.

In some embodiments, writepad device may send the input data to computing system 110, which may process or further process the input data based on tokens in the input data and the current context. In some embodiments, the tokens may be recognized and processed by applications running on computing system 110. In some embodiments, writepad device may transmit the position data to an application on computing system 110, which may keep track of the current context, perform analytic processing on the input and position data, including one or more of lexical analysis, character analysis, gesture recognition, stroke recognition, graphics analysis and/or parsing of the tokens generated by lexical analysis.

For example, the user may invoke an application on computing system 110 to cause the display of one or more images on writepad device 110. User input in this context may be the name of the image to be displayed or "next", "previous" "first" "last" etc. In another embodiment, where a math application has been invoked on computing system 110 and is the current context, writing a quadratic equation may cause the results of the quadratic equation to be displayed on writeable medium 120-1 after computing system processes input data entered by the user and returns results to writepad device 180. As one of ordinary skill in the art would appreciate, various other applications resident on writepad device 180 and/or computing system 110 may be used to provide a large number of applications for users of writepad device 180.

In step 250, the results of processing input data may be received. For example, the results may be received from computing system 110 or processing system 160. For example, the results of user input "2+3=?" may be displayed as "2+3=5," so that "5" is displayed at an appropriate location on writeable medium 120-1. As another example, writepad device may receive the solution of a quadratic equation from computing system 110, which may be displayed on writeable medium 120-1. In some embodiments, the results may be displayed at an appropriate location by updating and refreshing writeable medium 120-1 using output module 140. As a further example, in an application which causes stored images to be displayed, computing system 110 may send the image to be displayed on writeable medium 120-1 to writepad device 180. In some embodiments, processing system 160 may also play a part in controlling output module 140 that displays the received or retrieved display page on writeable medium 120-1.

Next, in step 260, the algorithm checks if there is additional input from the user. If there is additional input ("Y" in step 260), the algorithm returns to step 210 to begin another iteration. Otherwise ("N" in step 260), the process terminates in step 270.

In some applications, the device may initiate the interaction with the user. For example, the device may display a message, image or prompt to the user based on data resident on the device or data it has received from another device (not necessarily a writepad device). For example, the device may display the current time using an internal clock or show a weather forecast using the internet. As another example, in a tutoring application, the device may quiz the user with a mathematical expression and request and verify a response from the user. As a further example, in a graphics application, the device may present the user with a grid or suitable scaffold image to assist the user with drawing or painting.

Figure 3:
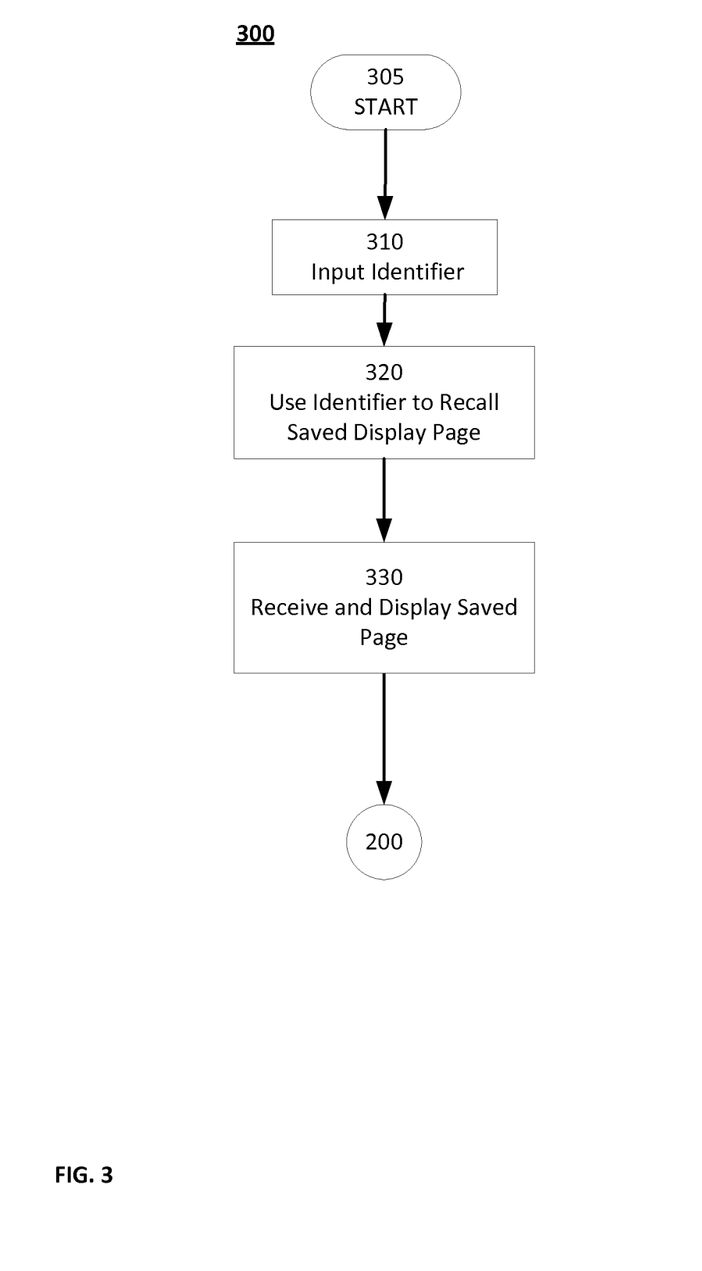
FIG. 3 shows a flowchart illustrating an exemplary method for recalling and displaying saved pages in a system for facilitating user interaction with computing systems using writeable media.
Figure 4:
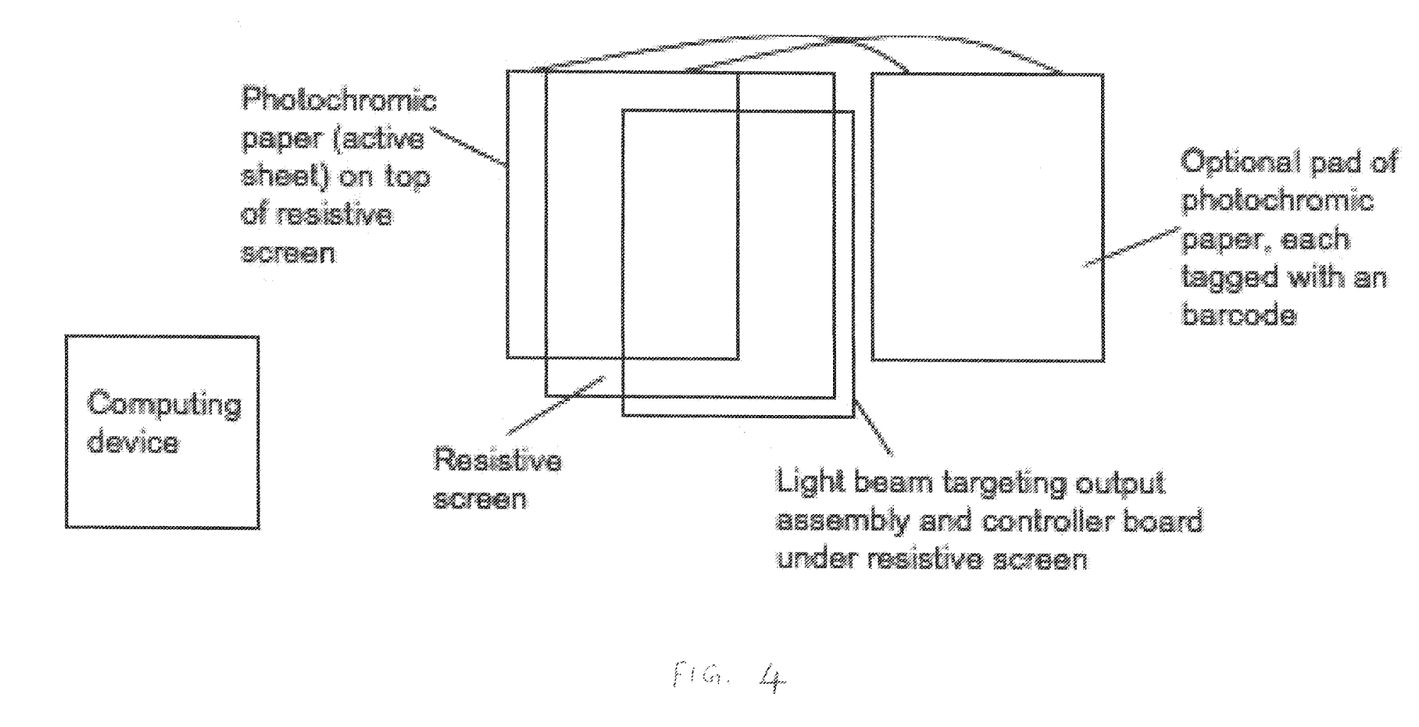
FIG. 4 shows an exemplary "Computing Device" with a resistive screen, a photochromic paper (active sheet) on top of the resistive screen and an optional pad of photochromic paper, each tagged with a barcode, and also a light beam targeting output assembly and controller board under the resistive screen.

FIG. 3 shows a flowchart illustrating an exemplary method 300 for recalling and displaying saved pages in a system for facilitating user interaction with computing systems using writeable media. In some embodiments, method 300 may start in step 305. For example, method 300 may start when the user loads or superimposes new writeable medium 120-$k$ to replace a current writeable medium.

In step 310, identifier 125-$k$ associated with writeable medium 120-$k$ may be input. In some embodiments, identifier 125-$k$ may be read from writeable medium 125-$k$. For example, a bar code reader may read a bar code associated with writeable medium 120-$k$ from the underside of writeable medium 120-$k$. As another example, a unique pattern of holes on each sheet of the writeable medium may be detected using optical sensors on the device. As another example, the user may input the page identifier to the device using appropriate inputs (such as buttons, gestures, voice commands etc.).

Next, in step 320, the identifier may be used to recall one or more saved display pages. In some embodiments, identifier 125-1 may be used by processing system 160 to recall a saved display page from memory. In some embodiments, identifier 125-$k$ may be sent to computing system 110-1 by writepad device 180 and the identifier 125-$k$ may be used by computing system 110 to look up and retrieve one or more saved display pages.

In step 330, the results of retrieving the display page associated with identifier may be received. For example, one or more display pages associated with identifier 125-$k$ may be retrieved by computing system 110 and sent to writepad device 180. In some embodiments, writepad device may display thumbnail images or other features of the received display pages and permit the user to select one of the saved display pages. In some embodiments, the most recently saved or the most frequently accessed page may be automatically displayed. In some embodiments, a user may be able to specify preferences to allow method 300 to select one of the retrieved display pages associated with identifier 125-*k* for display. In some embodiments, saved display pages may be retrieved using identifier 125-*k* from memory associated with processing system 160. In some embodiments, if a saved display page has been retrieved and displayed, or if no saved display page is associated with the identifier, then, the algorithm may proceed to execute method 200 and wait for user input.

In addition to the methods of input and output described previously, the device may have audio sensors and audio outputs to enable the device to optionally record, transmit or analyze sounds and optionally generate sounds in response. For example, the user may say a command to initiate processing of some written strokes. For example, the device may read out text written by the user. As another example, in a tutoring application, the device may voice advice or encouragement in response to what the user has written optionally in addition to the visual output described previously. Also, any feature that is indicated to be optional (e.g., by use of words such as "optionally", "can" or "may") may be expressly included or expressly excluded from the claimed device or methods of use in a manner consistent with the disclosure.

Other embodiments of the present invention will be apparent to those skilled in the art from consideration of the specification and practice of one or more embodiments of the invention disclosed herein. It is intended that the specification and examples be considered as exemplary only.

What is claimed is:

1. An apparatus comprising:
   (a) a writeable medium, wherein:
      (i) the writeable medium comprises at least one photochromic, thermochromic or electrochromic ink and does not comprise an electronic device,
      (ii) the writeable medium is superimposed on a surface of a writepad device and can be removed by hand; and
   (b) said writepad device, comprising:
      (i) a plurality of sensors, wherein the sensors generate position data by tracking a sequence of contact positions of a stylus manipulated by the user on the writeable medium; and
      (ii) a processing system, wherein the processing system:
         initiates a display of markings corresponding to the sequence of contact points of the stylus by causing a change in one or more optical properties of at least one ink of the superimposed writeable medium,
         generates tokens by performing pattern recognition based, in part, on the position data,
         executes commands by parsing the tokens, and
         initiates a display of the results obtained by the execution of commands by causing a change in one or more optical properties of at least one ink of the superimposed writeable medium.

2. The apparatus of claim 1, wherein the writeable medium is superimposed on a surface of a pressure-sensitive screen.

3. The apparatus of claim 1, wherein the apparatus comprises an output module which can generate an output stimulus to which the ink of the writeable medium is responsive.

4. The apparatus of claim 1, wherein the writeable medium comprises a photochromic ink.

5. The apparatus of claim 1, further comprising a backlight and an LCD mask positioned between the backlight and the writeable media.

6. The apparatus of claim 5, wherein the backlight is capable of emitting some but not all wavelengths in the visible range.

7. The apparatus of claim 1, wherein the writeable medium is paper or comprises cellulose.

8. The apparatus of claim 1, wherein the writeable medium comprises markings of ink.

9. The apparatus of claim 1, comprising interchangeable writeable media.

10. The apparatus of claim 9, wherein the writeable media comprises associated identifiers.

* * * * *